(12) United States Patent
Liverato et al.

(10) Patent No.: US 12,174,085 B2
(45) Date of Patent: *Dec. 24, 2024

(54) ROLLING BEARING WITH INTEGRATED OPTICAL FIBER SENSOR

(71) Applicant: Aktiebolaget SKF, Gothenburg (SE)

(72) Inventors: Yves-André Liverato, Saint Paterne Racan (FR); Alexander Mocnik, Steyr (AT); Olivier Verbe, Tours (FR); Matthias Zauner, Wolfern (AT)

(73) Assignee: Aktiebolaget SKF, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,460

(22) Filed: Feb. 21, 2023

(65) Prior Publication Data

US 2023/0204459 A1    Jun. 29, 2023

Related U.S. Application Data

(63) Continuation of application No. 16/896,386, filed on Jun. 9, 2020, now Pat. No. 11,656,150.

(30) Foreign Application Priority Data

Jul. 5, 2019   (DE) .......................... 102019209910.6

(51) Int. Cl.
*G01M 13/04* (2019.01)
*F16C 19/52* (2006.01)
(Continued)

(52) U.S. Cl.
CPC ........... *G01M 13/04* (2013.01); *F16C 19/522* (2013.01); *G01D 5/35303* (2013.01); *G02B 6/12* (2013.01); *G02B 2006/12138* (2013.01)

(58) Field of Classification Search
CPC ........... G02B 6/12; G02B 2006/12138; G01M 12/04; G01D 5/3503; F16C 19/522
See application file for complete search history.

(56) References Cited

U.S. PATENT DOCUMENTS

| 6,593,733 B1 | 7/2003 | Nicot |
| 6,920,801 B2 | 7/2005 | Van Leeuwen et al. |

(Continued)

FOREIGN PATENT DOCUMENTS

| DE | 10260904 A1 | 7/2004 |
| DE | 102009051556 A1 | 5/2011 |

(Continued)

*Primary Examiner* — Tina M Wong
(74) *Attorney, Agent, or Firm* — GARCIA-ZAMOR INTELLECTUAL PROPERTY LAW, LLC; Ruy Garcia-Zamor

(57) ABSTRACT

The rolling bearing provides a first ring, a second ring and at least one row of rolling elements arranged therebetween. Each of the first and second rings include an inner bore having an outer surface and at least one raceway for the row of rolling elements formed on one of the inner bore and outer surface. The first ring provides at least one part ring delimiting the raceway, and at least one sleeve secured to the part ring and delimiting at least partly the other of the inner bore and outer surface of the first ring. The rolling bearing further provides at least one optical fiber sensor mounted inside at least one circumferential groove formed on the first ring and passing through at least one optical fiber sensor passage opening into the circumferential groove.

20 Claims, 6 Drawing Sheets

(51) Int. Cl.
*G01D 5/353* (2006.01)
*G02B 6/12* (2006.01)

(56) References Cited

U.S. PATENT DOCUMENTS

| | | |
|---|---|---|
| 8,195,015 B2 | 6/2012 | Becker |
| 9,546,690 B2 | 1/2017 | Herdier et al. |
| 11,047,423 B2 | 6/2021 | Hebrard |
| 2003/0164050 A1 | 9/2003 | Chinitz et al. |
| 2004/0261543 A1 | 12/2004 | Van Leeuwen |
| 2010/0158434 A1 | 6/2010 | Becker |
| 2010/0303400 A1 | 12/2010 | Duppe et al. |
| 2012/0328232 A1 | 12/2012 | Reedman |
| 2015/0323013 A1 | 11/2015 | Herdier |
| 2018/0348019 A1 | 12/2018 | Sorlier |
| 2019/0178295 A1 | 6/2019 | Hebrard |
| 2020/0333373 A1 | 10/2020 | Liverato |
| 2021/0003478 A1 | 1/2021 | Liverato |

FOREIGN PATENT DOCUMENTS

| | | |
|---|---|---|
| DE | 102015205260 A1 | 9/2016 |
| DE | 102015112056 A1 | 1/2017 |
| DE | 102017217813 A1 | 4/2019 |
| EP | 2507603 A1 | 10/2012 |
| EP | 2740948 A1 | 6/2014 |
| JP | 2006312955 A | 11/2006 |
| JP | 2009185859 A | 8/2009 |
| WO | 2011066926 A1 | 6/2011 |
| WO | 2014090324 A1 | 6/2014 |

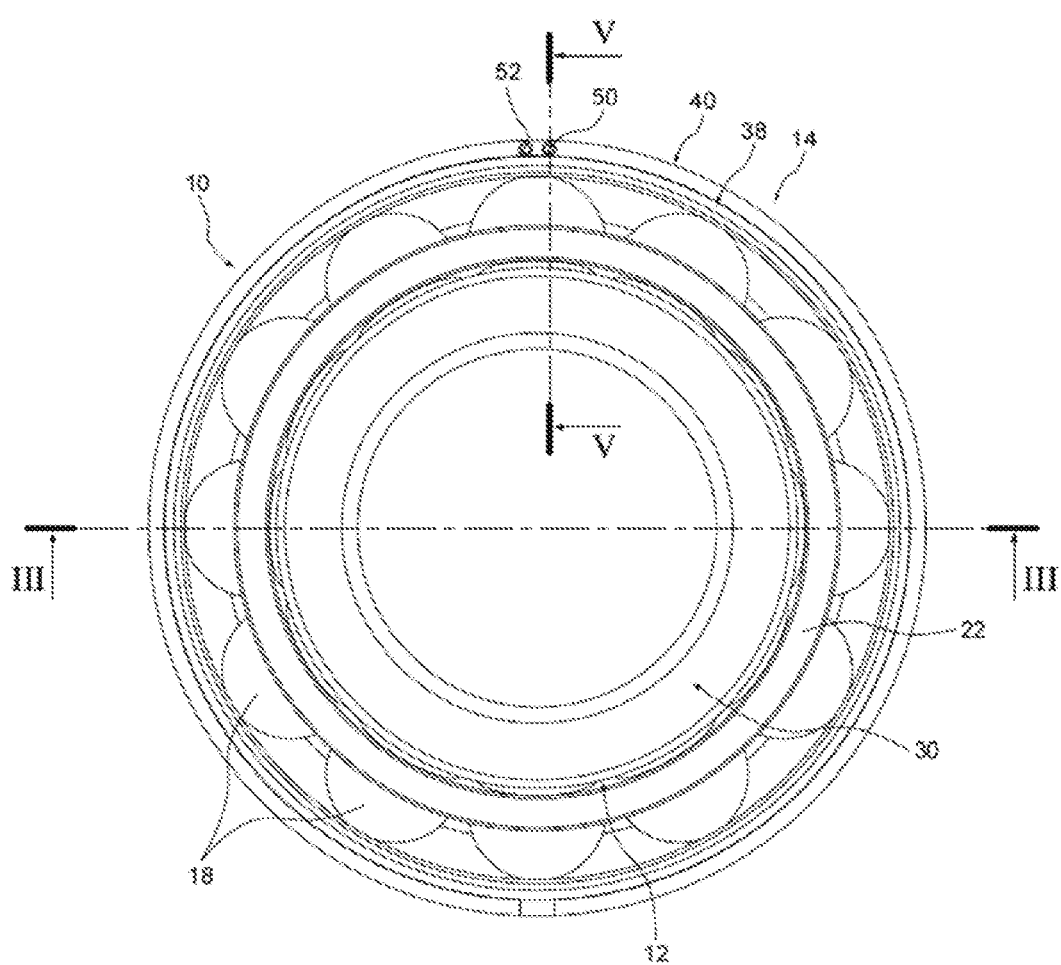

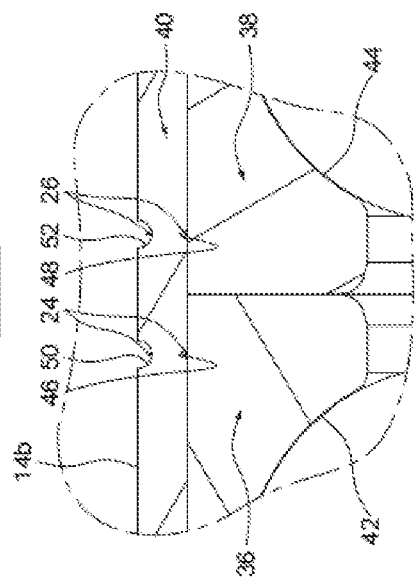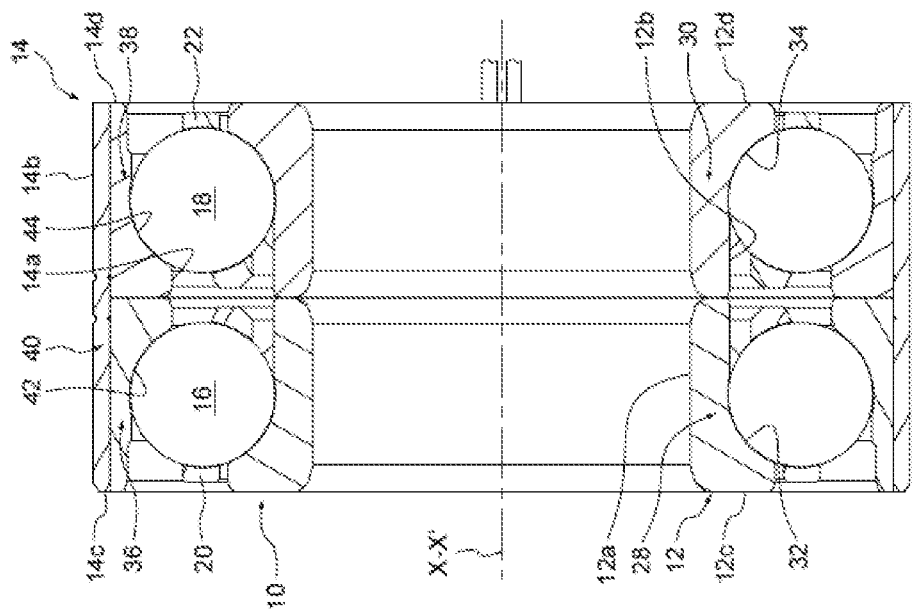

ROLLING BEARING WITH INTEGRATED OPTICAL FIBER SENSOR

CROSS-REFERENCE TO RELATED APPLICATIONS

This application is a continuation of U.S. patent application Ser. No. 16/896,386, filed on Jun. 9, 2020, which claims priority to and benefit of the following German patent application: DE 102019209910.6, filed Jul. 5, 2019; each of these applications is hereby incorporated by reference in its entirety as if fully set forth herein.

TECHNICAL FIELD OF THE INVENTION

The present invention relates to condition monitoring of rolling bearings, notably the load sensing. More precisely, the present invention relates to a rolling bearing with integrated optical fiber sensor.

BACKGROUND OF THE INVENTION

In order to estimate bearing loads acting on a rolling bearing, it is known to integrate strain sensors onto the fixed stationary ring of the bearing.

In order to be able to measure different parameters and to monitor the condition of a rolling bearing in a reliable manner without any electrical power locally at the bearing, it is also known to use optical fiber sensors. For example, it is possible to refer to the patent EP2507603B1 (SKF).

Such optical fiber sensors may be disposed in circumferential grooves formed on the outer surface of the non-rotating outer ring. The outer ring is also provided with passages for entry/exit of the optical fiber sensors. Generally, such passages have complex shapes, for example like curves.

Classically, the grooves and the optical fiber sensor passages are machined on the heat-treated outer ring.

The main drawback of this solution is the cost of the operations, due to the very long machining time needed for very small milling tool. For example, the machining of the optical fiber sensor passages alone takes several hours.

One aim of the present invention is to overcome this drawback.

SUMMARY OF THE INVENTION

In one embodiment, the rolling bearing comprises a first ring, a second ring, and at least one row of rolling elements arranged therebetween.

Each of the first and second rings is provided with an inner bore, with an outer surface and with at least one raceway for the row of rolling elements formed on one of the inner bore and outer surface.

According to a general feature, the first ring comprises at least one part ring delimiting the raceway formed on one of the inner bore and outer surface. The first ring also comprises at least one sleeve secured to the part ring and delimiting at least partly the other of the inner bore and outer surface of the first ring. The sleeve is made from a softer material than that of the part ring.

According to another general feature, the rolling bearing further comprises at least one optical fiber sensor mounted inside at least one circumferential groove formed on the first ring and passing through at least one optical fiber sensor passage opening into the circumferential groove. At least the optical fiber sensor passage is formed on the sleeve of the first ring.

With such an arrangement, the complex machining of the optical fiber sensor passage, for example with curves, is made on the soft sleeve. If the soft sleeve is made by molding, for example from plastic material, the optical fiber sensor passage may also be obtained during molding. Additive manufacturing can also be used for obtaining the sleeve.

Otherwise, there is no change in the bearing behavior with respect to a conventional bearing since the part ring made of hard material delimits the raceway of the first ring.

Advantageously, the sleeve and the part ring of the first ring are mounted radially in contact one against the other.

The optical fiber sensor may be located radially between the sleeve and the part ring of the first ring. Accordingly, the optical fiber sensor is disposed inside the first ring.

In one embodiment the circumferential groove may be formed on the inner bore, or outer surface, of the sleeve mounted radially in contact with the part ring.

In another embodiment, the circumferential groove may be formed on the inner bore, or outer surface, of the sleeve which is not mounted radially in contact with the part ring. In such embodiment, the circumferential groove may be filled with potting resin.

In these two embodiments, the optical fiber sensor passage as well as the circumferential groove are provided on the sleeve. This facilitates again the fabrication operations. The optical fiber sensor passage may extend from a frontal face of the sleeve.

Alternatively, the circumferential groove may be formed on the inner bore, or outer surface, of the part ring mounted radially in contact with the sleeve.

Accordingly, the optical fiber sensor may be placed deeper in the rolling bearing, in an area with higher strains. This leads to higher sensitivity of the measurements.

Advantageously, the circumferential groove is axially disposed on the sleeve, or on the part ring, in order to be located, considering a radial plane of the bearing, on the line joining the points of contact of the rolling element of the row and the raceways of the first and second rings.

Therefore, the optical fiber sensor may be placed on the line along which the combined load is transmitted from one raceway to another.

In one specific embodiment, the first ring comprises at least two part rings mounted axially in contact one against the other. In this case, the part ring is split into stacked ring segments.

Advantageously, in such embodiment, the sleeve maintains together the part rings of the first ring. Accordingly, the sleeve is used to lock the part rings. No extra drillings and pins are needed.

The rolling bearing may comprise at least two rows of rolling elements arranged between the first and second rings, the part rings of the first ring each delimiting one raceway for one of the two rows of rolling elements.

In one embodiment, the sleeve of the first ring is provided with at least one protrusion extending radially towards the second ring, the circumferential groove being formed on the protrusion. Accordingly, the optical fiber sensor may also be placed deeper in the rolling bearing, in an area with higher strains.

The first ring of the rolling bearing is the outer ring when the inner ring is the rotating ring. Alternatively, the first ring of the rolling bearing is the inner ring when the outer ring is the rotating ring.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention and its advantages will be better understood by studying the detailed description of specific embodiments given by way of non-limiting examples and illustrated by the appended drawings on which:

FIG. 2 is a front view of the rolling bearing of FIG. 1, FIG. 3 is a section on III-III of FIG. 2, FIG. 4 is a detail view of FIG. 3, FIG. 5 is a section on V-V of FIG. 2.

DETAILED DESCRIPTION OF SOME EMBODIMENTS

Figure 1:
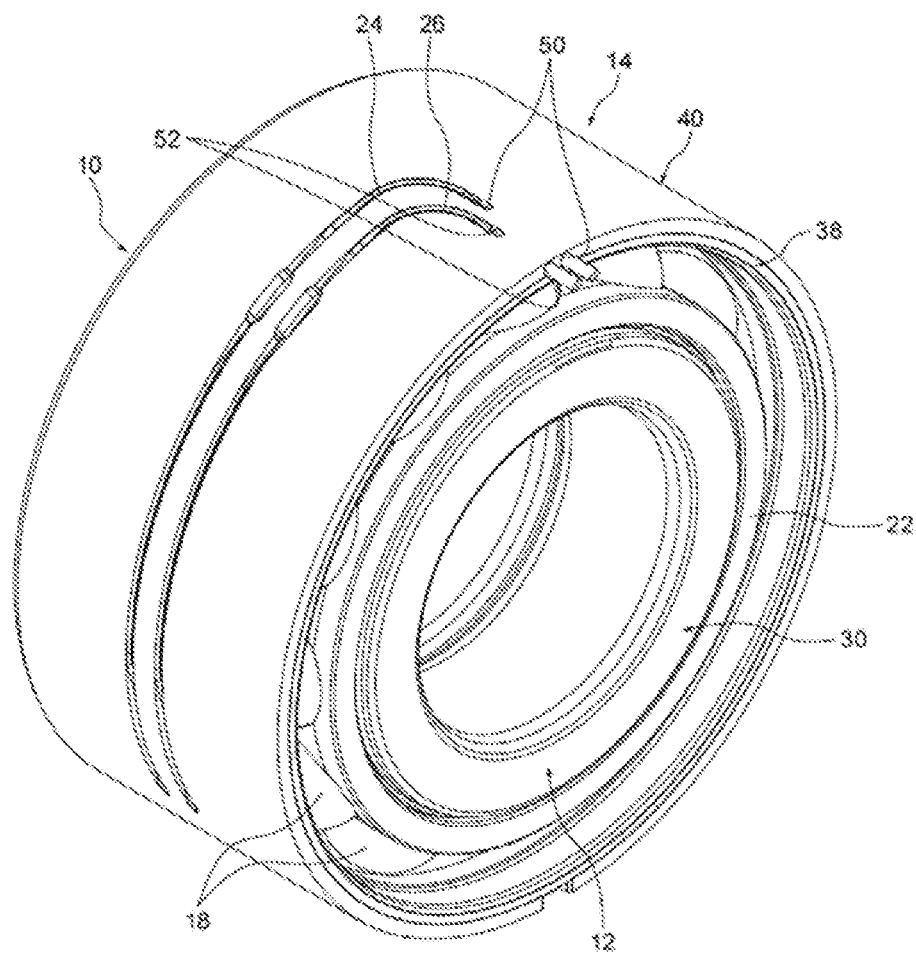
FIG. 1 is a perspective view of a rolling bearing according to a first example of the invention.

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the invention. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C'; —and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

The rolling bearing 10 as illustrated on FIGS. 1 and 2 comprises an inner ring 12 and an outer ring 14. The inner and outer rings 12, 14 are concentric and extend axially along the bearing rotation axis X-X' (FIG. 3) which runs in an axial direction.

As shown more clearly on FIG. 3, the rolling bearing 10 also comprises two rows of rolling elements 16, 18, which are provided here in the form of balls, interposed between the inner and outer rings 12, 14. The rolling bearing 10 also comprises two cages 20, 22 for maintaining the regular circumferential spacing of the rolling elements 16, 18 of each row.

As will be described later, the rolling bearing 10 further comprises two optical fiber sensors 24, 26 provided on the outer ring 14.

In the disclosed example, the inner ring 12 is formed as a split-ring. The inner ring 12 is formed by the assembling of two annular part rings 28, 30 which are mounted axially in contact one against the other. In other words, the inner ring 12 is subdivided in the axial direction by the two part rings 28, 30. The two part rings 28, 30 are identical one to another, and symmetric with respect to the transverse radial plane passing through the centre of the rolling bearing 10.

The inner ring 12 comprises a cylindrical inner bore 12*a* and an opposite cylindrical outer surface 12*b* from which two toroidal circular raceways 32, 34 for the rolling elements 16, 18 are formed, the raceway being directed radially outwards. The inner ring 12 further comprises two opposite radial frontal lateral faces 12c, 12d which axially delimit the bore 12a and the outer surface 12b of the ring.

In the disclosed example, the outer ring 14 comprises also two annular part rings 36, 38 which are mounted axially in contact one against the other. The two part rings 36, 38 are identical. The two part rings 36, 38 are also symmetric with respect to the transverse radial plane passing through the centre of the rolling bearing 10. The part rings 28, 30 and 36, 38 of the inner and outer rings are made of metal, for example a hardened steel. Alternatively, only the raceways provided on these part rings may be hardened.

The outer ring 14 further comprises an annular sleeve 40 made separately from the part rings 36, 38 and secured thereto. The sleeve 40 may be secured to the part rings 36, 38 by any appropriate means, for example by gluing, fretting, welding, etc.

The sleeve 40 is mounted radially around the part rings 36, 38. The sleeve 40 is mounted radially in contact with the part rings 36, 38. The sleeve 40 radially recovers the part rings 36, 38. The sleeve 40 is mounted on the outer surfaces of the part rings 36, 38.

The outer ring 14 comprises a cylindrical inner bore 14a from which two toroidal circular raceways 42, 44 for the rolling elements 16, 18 are formed, the raceway being directed radially inwards. The outer ring 14 further comprises a cylindrical outer surface 14b which is opposite to the inner bore with regard to the radial direction.

The outer ring 14 further comprises two opposite radial frontal lateral faces 14c, 14d which axially delimit the bore 14a and the outer surface 14b of the ring. The lateral face 14d of the outer ring is coplanar with the lateral face 12d of the inner ring. The lateral face 14c of the outer ring is coplanar with the lateral face 12c of the inner ring.

The bore 14a and the raceways 42, 44 of the outer ring are formed by the part rings 36, 38. The outer surface 14b of the outer ring is formed by the sleeve 40. The lateral face 14c of the outer ring is formed both by the part ring 36 and the sleeve 40. Similarly, the lateral face 14d of the outer ring is formed by the part ring 38 and the sleeve 40.

The sleeve 40 comprises a cylindrical inner bore mounted radially in contact with the outer surfaces of the part rings 36 and 38, and an opposite cylindrical outer surface forming the outer surface 14b of the outer ring. The sleeve 40 also comprises two opposite radial frontal lateral faces which axially delimit the bore and the outer surface of the sleeve. Each lateral faces 14c, 14d of the outer ring is partly formed by one of these lateral faces of the sleeve.

As previously mentioned, the outer ring 14 is provided with two optical fiber sensors 24, 26. As shown more clearly on FIG. 4, two circumferential grooves 46, 48 are formed on the bore of the sleeve 40 inside which are respectively mounted the optical fiber sensors 24, 26.

In the disclosed example, the circumferential grooves 46, 48 have an annular form. Alternatively, the circumferential grooves 46, 48 may be not annular. For example, the circumferential grooves 46, 48 may extend over an angular sector less than equal to 340°.

The groove 46 radially surrounds the part ring 36. The groove 48 radially surrounds the part ring 38. The grooves 46, 48 are closed by the part rings 36, 38. The groove 46 is axially disposed on the bore of the sleeve 40 in order to be located on the line (not shown) joining the points of contact of the rolling element 16 and the inner and outer raceways 32, 42 in the radial plane, along which the load may be transmitted from one raceway to another.

Similarly, the groove 48 is axially disposed on the bore of the sleeve 40 in order to be located on the line (not shown) joining the points of contact of the rolling element 18 and the inner and outer raceways 34, 44 in the radial plane.

The thickness of the sleeve 40 is defined to position the optical fiber sensors 24, 26 at the desired depth to optimize the measurement performance. For example, the thickness of the sleeve 40 may be comprised within a range of 20% to 50% of the global thickness of the outer ring 14.

Referring once again to FIG. 1, the sleeve 40 is also provided with passages 50, 52 for entry/exit of the optical fiber sensors. In the disclosed example, each passage 50, 52 extends axially from one of the frontal faces of the sleeve 40 into the thickness of the sleeve, and open on the outer surface of the sleeve. This is also shown on FIG. 5 for the passage 50.

On the outer surface of the sleeve 40, each passage 50, 52 comprises an axial portion which is extended by a curved portion itself extended by a circumferential portion. The end of the circumferential portion of each passage 50, 52 extends radially into the thickness of the sleeve, and opens into the associated grove 46, 48.

The sleeve 40 is made from a softer material than that of the part rings 36, 38. For example, the sleeve 40 may have a hardness lower than 38 Vickers. The part rings 36, 38 may have at least a hardness of 58 Vickers.

The sleeve 40 may be made from metal, for example steel or metal alloy. Since the sleeve 40 is made from a softer material than that of the part rings 36, 38, the machining of the passages 50, 52 with curved portions is easier. This also leads to a reduction of the machining time for the grooves 46, 48. Alternatively, the sleeve 40 may be made from plastic material. In this case, the passages 50, 52 and the grooves 46, 48 are formed on the sleeve during molding.

As previously mentioned, each optical fiber sensor 24, 26 is mounted inside the associated groove 46, 48 formed on the bore of the sleeve 40. Each optical fiber sensor 24, 26 is also mounted inside the passage 50, 52 which is formed on the sleeve 40 and opens into the associated groove 46, 48.

Each passage 50, 52 enables to manually guide the associated optical fiber sensor 24, 26 when the sensor is axially introduced inside the thickness of the sleeve and then tangentially introduced into the groove 48, 50. After one turn inside the associated groove 48, 50, the associated optical fiber sensor 24, 26 exits the groove and is secured inside the passage 50, 52.

Each optical fiber sensor 24, 26 is provided with a plurality of light distorting structures which could be fiber Bragg gratings for example. For more detail concerning such optical fiber sensors, it is possible for example to refer to the patent EP-B1-2 802 796 (SKF). The optical fiber sensors 24, 26 may be used to measure different parameters of the rolling bearing 10, for example loads, temperatures, pressures, vibrations, etc.

Figure 7:
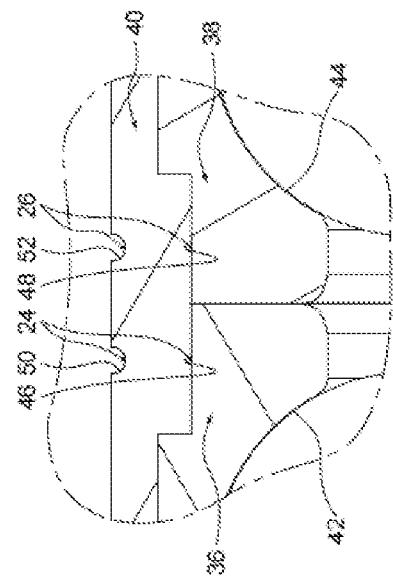
FIG. 7 is a detail view of FIG. 6.
Figure 6:
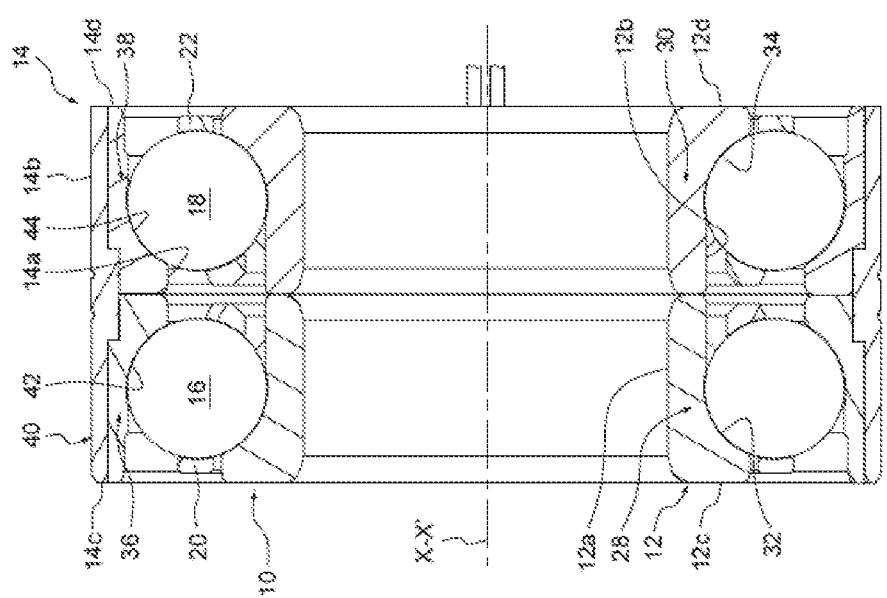
FIG. 6 is a section of a rolling bearing according to a second example of the invention.

The embodiment shown on FIGS. 6 and 7, in which identical parts are given identical references, differs from the previous embodiment in that bore of the sleeve 40 is provided with an annular protrusion 54 extending radially inwards into recesses (not referenced) formed on the outer surface of the part rings 36, 38. The circumferential grooves 46, 48 are formed on the bore of the protrusion 54. With such arrangement, the optical fiber sensors 24, 26 are placed deeper in the rolling bearing.

Figure 9:
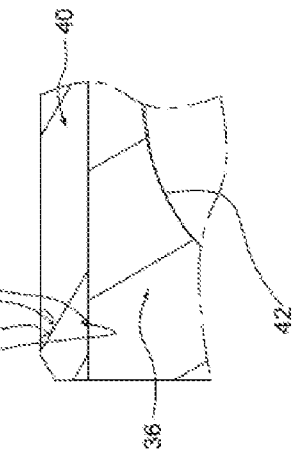
FIG. 9 is a detail view of FIG. 8.
Figure 8:
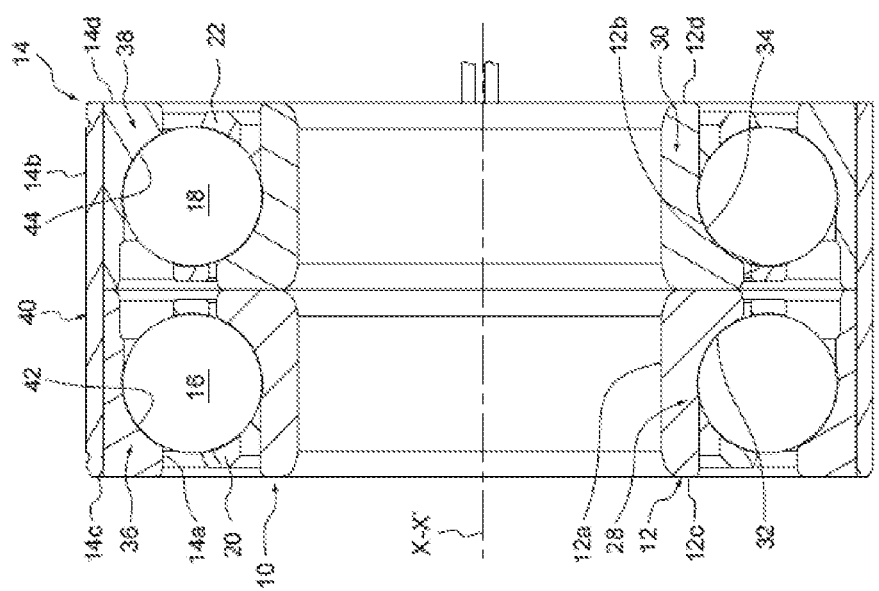
FIG. 8 is a section of a rolling bearing according to a third example of the invention.

In the previous illustrated examples, the part rings 28, 36 and 30, 38 are disposed according to a back-to-back bearing arrangement. Alternatively, it could be possible to dispose the part rings 28, 36 and 30, 38 in a face-to-face bearing arrangement as illustrated in the embodiment shown on FIGS. 8 and 9, or in a tandem arrangement.

With such face-to-face bearing arrangement, it is also possible to foresee a sleeve 40 provided with two protrusions extending radially inwards into recesses formed on the outer surface of the part rings 36, 38, and onto which are formed the circumferential grooves 46, 48.

In the previous illustrated examples, the outer ring 14 is provided with the sleeve 40 since the inner ring 12 is the ring which is intended to rotate.

Figure 11:
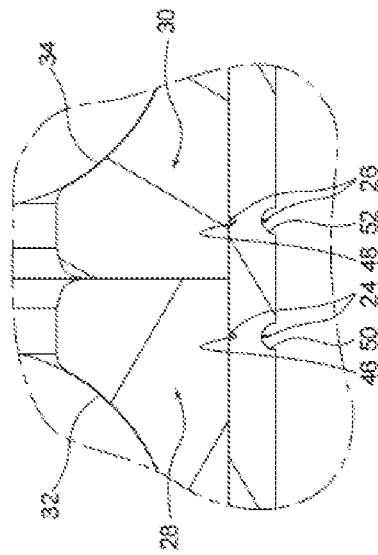
FIG. 11 is a detail view of FIG. 10.
Figure 10:
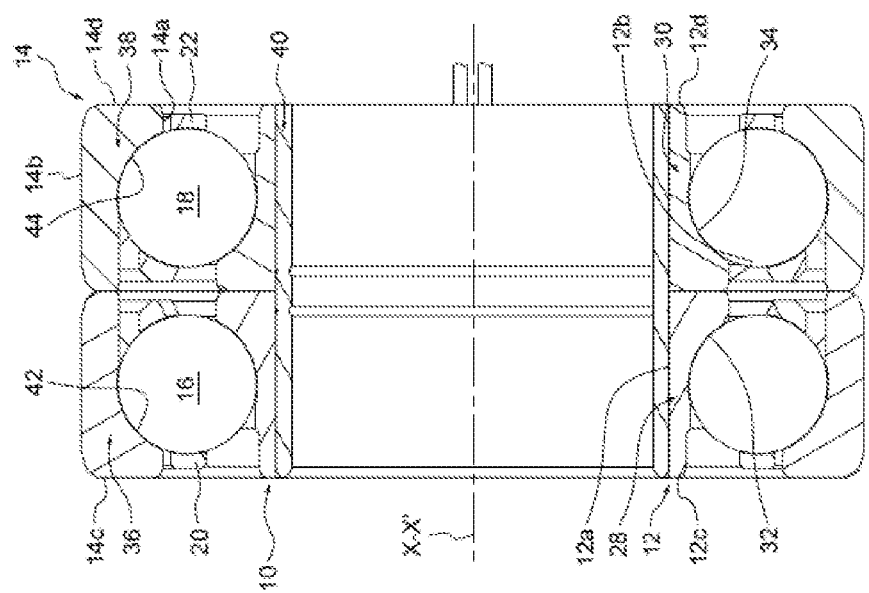
FIG. 10 is a section of a rolling bearing according to a fourth example of the invention.

Alternatively, when the outer ring 14 is the ring which is intended to rotate, the inner ring 12 may be provided with the sleeve 40 as illustrated for example in the embodiment shown on FIGS. 10 and 11 in which identical parts are given identical references.

In this embodiment, the sleeve 40 is mounted into the bore of the part rings 36, 38. The outer surface of the sleeve 40 is mounted radially in contact with the bore of the part rings 28, 30. The circumferential grooves 46, 48 are formed on the outer surface of the sleeve 40. The passages 50, 52 for entry/exit of the optical fiber sensors extends axially from one of the frontal faces of the sleeve 40 into the thickness of the sleeve, and open on the bore of the sleeve. Each passage 50, 52 extends axially and circumferentially along the bore of the sleeve 40, and extends radially into the thickness of the sleeve and opens into the associated grove 46, 48.

In this embodiment, the part rings 28, 36 and 30, 38 are disposed according to a face-to-face bearing arrangement. Alternatively, it could be possible to dispose the part rings 28, 36 and 30, 38 in a back-to-back bearing arrangement or in a tandem arrangement. The outer surface of the sleeve 40 may also be provided with one or two protrusions extending radially outwards into recesses formed in the bore of the part rings 28, 30, and onto which are formed the circumferential grooves 46, 48.

In the illustrated examples, the sleeve 40 extends on the whole length of the associated part rings. Alternatively, the sleeve 40 may have a reduced length.

In the illustrated examples, the grooves 46, 48 and the passages 50, 52 are both provided on the sleeve 40. Alternatively, only the passages 50, 52 having curves may be provided on the sleeve 40. In this case, the grooves 46, 48 are formed on the part rings of the outer ring 14 or inner ring 12. Accordingly, the optical fiber sensors 24, 26 are placed deeper in the rolling bearing, in an area with higher strains.

The invention has been illustrated on the basis of a rolling bearing comprising inner and outer rings provided with two annular part rings mounted axially in contact one against the other. Alternatively, the inner ring and/or the outer ring may comprise only one part ring, or three part rings or more.

In the illustrated examples, the rolling bearing comprises two rows of rolling elements. Alternatively, the rolling bearing may comprise only one row of rolling elements, or three rows or more. In the illustrated examples, the rolling elements are balls. Alternatively, the rolling bearing may comprise other types of rolling elements, for example rollers. In the disclosed examples, the rolling bearing is adapted to accommodate both axial and radial loads. Alternatively, it may also be possible to have a rolling bearing adapted to accommodate axial loads or radial loads only.

The invention claimed is:

1. A rolling bearing comprising:
   a first ring comprising at least two first annular rings being mounted axially in contact with one another, the at least two first annular rings of the first ring defining a radially outermost first ring surface, the at least two first annular rings defining at least two first inner bores which form at least two first raceways, when viewed in axial cross-section the first ring has a first axial ring end and a second axial ring end;
   a sleeve positioned on the radially outermost first ring surface, the sleeve being made from a softer material than that of the first ring, when viewed in axial cross-section the sleeve has a first axial sleeve end and a second axial sleeve end, the sleeve having an axially extending radially outermost sleeve surface;
   wherein, when viewed in axial cross-section a first curved ring surface connects the first axial ring end and the radially outermost ring surface;
   a second ring comprising at least two second annular rings being mounted axially in contact with one another, the at least two second annular rings of the second ring defining an outer second ring surface, the outer second ring surface defining at least two second raceways corresponding to the at least two second annular rings;
   at least two rows of rolling elements arranged between the at least two first raceways and the at least two second raceways; and an optical fiber sensor positioned between the sleeve and the first ring, the sleeve further defining an optical fiber sensor passage extending between a circumferential groove and the outer sleeve surface.

2. The rolling bearing of claim 1, wherein the sleeve axially overlapping the entirety of the radially outermost first ring surface such that the sleeve overlaps the radially outermost first ring surface in both the axial direction and the circumferential direction so that the sleeve entirely covers the radially outermost first ring surface.

3. The rolling bearing of claim 1, wherein the sleeve is made from a softer material than that of the first ring.

4. The rolling bearing of claim 1, wherein the optical fiber sensor is positioned inside a radial inner surface of the sleeve and also positioned on the first ring.

5. The rolling bearing of claim 4, wherein the radial inner surface of the sleeve defines a circumferential groove which partially encloses the optical fiber sensor, the sleeve further defining an optical fiber sensor passage extending between the circumferential groove and the outer sleeve surface.

6. The rolling bearing of claim 5, wherein the optical fiber sensor passage extends from the first axial sleeve end.

7. A rolling bearing comprising:
   a first ring having a radially outermost first ring surface, the first ring defining a first inner bore which forms a first raceway, when viewed in axial cross-section the first ring has a first axial ring end and a second axial ring end;
   a sleeve positioned on the radially outermost first ring surface, the sleeve being made from a softer material than that of the first ring, when viewed in axial cross-section the sleeve has a first axial sleeve end and a second axial sleeve end, the sleeve having an axially extending radially outermost sleeve surface;
   wherein, when viewed in axial cross-section a first curved ring surface connects the first axial ring end and the radially outermost ring surface;
   a second ring having an outer second ring surface and a second inner bore, the outer second ring surface defining a second raceway;
   a row of rolling elements arranged between the first raceway and the second raceway; and
   an optical fiber sensor positioned between the sleeve and the first ring, the sleeve further defining an optical fiber sensor passage extending between a circumferential groove and the outer sleeve surface;

wherein a second optical fiber sensor is located radially between the sleeve and the first ring.

8. A rolling bearing comprising:
a first ring comprising at least two first annular rings being mounted axially in contact with one another, the at least two first annular rings of the first ring defining a radially outermost first ring surface, the at least two first annular rings defining at least two first inner bores which form at least two first raceways, when viewed in axial cross-section the first ring has a first axial ring end and a second axial ring end;
a sleeve positioned on the radially outermost first ring surface, the sleeve being made from a softer material than that of the first ring, when viewed in axial cross-section the sleeve has a first axial sleeve end and a second axial sleeve end, the sleeve having an axially extending radially outermost sleeve surface;
wherein, when viewed in axial cross-section a first curved ring surface connects the first axial ring end and the radially outermost ring surface and a first curved sleeve surface connects the first axial sleeve end and the axially extending radially outermost sleeve surface;
a second ring comprising at least two second annular rings being mounted axially in contact with one another, the at least two second annular rings of the second ring defining an outer second ring surface, the outer second ring surface defining at least two second raceways corresponding to the at least two second annular rings;
At least two rows of rolling elements arranged between the at least two first raceways and the at least two second raceways; and
an optical fiber sensor positioned between the sleeve and the first ring, the sleeve further defining an optical fiber sensor passage extending between a circumferential groove and the outer sleeve surface.

9. The rolling bearing of claim 8, wherein the sleeve axially overlapping the entirety of the radially outermost first ring surface such that the sleeve overlaps the radially outermost first ring surface in both the axial direction and the circumferential direction so that the sleeve entirely covers the radially outermost first ring surface.

10. The rolling bearing of claim 8, wherein the sleeve is made from a softer material than that of the first ring.

11. The rolling bearing of claim 8, wherein the optical fiber sensor is positioned inside a radial inner surface of the sleeve and also positioned on the first ring.

12. The rolling bearing of claim 11, wherein the radial inner surface of the sleeve defines a circumferential groove which partially encloses the optical fiber sensor, the sleeve further defining an optical fiber sensor passage extending between the circumferential groove and the outer sleeve surface.

13. The rolling bearing of claim 12, wherein the optical fiber sensor passage extends from the first axial sleeve end.

14. A rolling bearing comprising:
a first ring having a radially outermost first ring surface, the first ring defining a first inner bore which forms a first raceway, when viewed in axial cross-section the first ring has a first axial ring end and a second axial ring end;
a sleeve positioned on the radially outermost first ring surface, the sleeve being made from a softer material than that of the first ring, when viewed in axial cross-section the sleeve has a first axial sleeve end and a second axial sleeve end, the sleeve having an axially extending radially outermost sleeve surface;
wherein, when viewed in axial cross-section a first curved ring surface connects the first axial ring end and the radially outermost ring surface and a first curved sleeve surface connects the first axial sleeve end and the axially extending radially outermost sleeve surface;
a second ring having an outer second ring surface and a second inner bore, the outer second ring surface defining a second raceway;
a row of rolling elements arranged between the first raceway and the second raceway; and
an optical fiber sensor positioned between the sleeve and the first ring, the sleeve further defining an optical fiber sensor passage extending between a circumferential groove and the outer sleeve surface;
wherein a second optical fiber sensor is located radially between the sleeve and the first ring.

15. A rolling bearing comprising:
a first ring comprising at least two first annular rings being mounted axially in contact with one another, the at least two first annular rings of the first ring defining a radially outermost first ring surface, at least two first inner bores, which form at least two first raceways, and opposing lateral faces extending therebetween;
a second ring comprising at least two second annular rings being mounted axially in contact with one another, the at least two second annular rings of the second ring defining an outer second ring surface, the outer second ring surface defining at least two second raceways corresponding to the at least two second annular rings;
At least two rows of rolling elements arranged between the at least two first raceways and the at least two second raceways;
a sleeve secured to the first ring, the sleeve having an outer sleeve surface, the sleeve axially overlapping the entirety of the radially outermost first ring surface such that the sleeve overlaps the radially outermost first ring surface in both the axial direction and the circumferential direction so that the sleeve entirely covers the radially outermost first ring surface, the sleeve being made from a softer material than that of the first ring;
and an optical fiber sensor positioned inside a radial inner surface of the sleeve and also positioned directly adjacent to and contacting the radially outermost first ring surface such that when the rolling bearing is viewed in axial cross-section a portion of the radially outermost first ring surface which is axial, the radial inner surface of the sleeve defining a circumferential groove which partially encloses the optical fiber sensor, the sleeve further defining an optical fiber sensor passage extending between the circumferential groove and the outer sleeve surface,
wherein the radially outermost first ring surface is substantially axially planar.

16. The rolling bearing of claim 15, wherein the optical fiber contacting the radially outermost first ring surface is not located in a groove therein.

17. The rolling bearing of claim 15, wherein the circumferential groove is formed on the radial inner surface of the sleeve.

18. The rolling bearing of claim 15, wherein circumferential groove is axially disposed on the sleeve so as to be axially aligned with points of contact of the row of rolling elements, the first raceway, and the second raceway.

19. The rolling bearing of claim 15, wherein the optical fiber sensor passage extends from an axial end of the sleeve.

20. A rolling bearing comprising:
a first ring having a radially outermost first ring surface, a first inner bore, the first inner bore defining a first raceway, and opposing lateral faces extending therebetween;
a second ring having an outer second ring surface and a second inner bore, the outer second ring surface defining a second raceway; and a row of rolling elements arranged between the first raceway and the second raceway, a sleeve secured to the first ring, the sleeve having an outer sleeve surface, the sleeve axially overlapping the entirety of the radially outermost first ring surface such that the sleeve overlaps the radially outermost first ring surface in both the axial direction and the circumferential direction so that the sleeve entirely covers the radially outermost first ring surface, the sleeve being made from a softer material than that of the first ring;
and an optical fiber sensor positioned inside a radial inner surface of the sleeve and also positioned directly adjacent to and contacting the radially outermost first ring surface such that when the rolling bearing is viewed in axial cross-section a portion of the radially outermost first ring surface which is axial, the radial inner surface of the sleeve defining a circumferential groove which partially encloses the optical fiber sensor, the sleeve further defining an optical fiber sensor passage extending between the circumferential groove and the outer sleeve surface,
wherein the radially outermost first ring surface is substantially axially planar;
wherein a second optical fiber sensor is located radially between the sleeve and the first ring.

* * * * *